(12) United States Patent
Wakabayashi et al.

(10) Patent No.: US 12,576,540 B2
(45) Date of Patent: Mar. 17, 2026

(54) ROBOT CONTROL DEVICE

(71) Applicant: FANUC CORPORATION, Yamanashi (JP)

(72) Inventors: Kazuki Wakabayashi, Yamanashi (JP); Yihua Gu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 194 days.

(21) Appl. No.: 18/547,723

(22) PCT Filed: Apr. 30, 2021

(86) PCT No.: PCT/JP2021/017273
§ 371 (c)(1),
(2) Date: Aug. 24, 2023

(87) PCT Pub. No.: WO2022/230200
PCT Pub. Date: Nov. 3, 2022

(65) Prior Publication Data
US 2024/0131725 A1    Apr. 25, 2024
US 2024/0227202 A9    Jul. 11, 2024

(51) Int. Cl.
     *B25J 13/08*      (2006.01)
     *B25J 15/12*      (2006.01)
(52) U.S. Cl.
     CPC ............. *B25J 13/085* (2013.01); *B25J 15/12* (2013.01)
(58) Field of Classification Search
     CPC ........ B25J 13/085; B25J 15/12; B25J 9/1692; B25J 9/1694; G05B 2219/39058; G05B 2219/39529

USPC ........................................................ 700/258
See application file for complete search history.

(56) References Cited

U.S. PATENT DOCUMENTS

| | | | | |
|---|---|---|---|---|
| 9,919,424 | B1 * | 3/2018 | Devengenzo | ............ B25J 15/02 |
| 2013/0061695 | A1 * | 3/2013 | Sato | ......................... G01G 9/00 |
| | | | | 73/865 |
| 2017/0106541 | A1 * | 4/2017 | Naitou | ................... B25J 13/085 |
| 2018/0169854 | A1 * | 6/2018 | Shiratsuchi | .......... B25J 11/0095 |
| 2019/0009410 | A1 * | 1/2019 | Radrich | ................. B25J 9/1638 |

(Continued)

FOREIGN PATENT DOCUMENTS

| | | | |
|---|---|---|---|
| JP | S62-237335 | A | 10/1987 |
| JP | 2515594 | B | 7/1996 |

(Continued)

*Primary Examiner* — B M M Hannan
(74) *Attorney, Agent, or Firm* — Maier & Maier, PLLC

(57) ABSTRACT

A robot control device controls a robot equipped with a sensor capable of measuring force, the robot control device including: a measurement value acquisition unit acquires a first measurement value measured by the sensor when a first tool having a known mass and center-of-gravity position is placed at the tip of the wrist of the robot and the wrist performs a specific motion, and a second measurement value measured by the sensor when a second tool having a known mass and center-of-gravity position is placed and the wrist performs a specific motion; a measurement value storage unit that stores the first measurement value and the second measurement value acquired by the measurement value acquisition unit; and a correction unit that corrects the measurement values from the sensor, on the basis of the first measurement value and the second measurement value stored in the measurement value storage unit.

8 Claims, 4 Drawing Sheets

(56)                    References Cited

U.S. PATENT DOCUMENTS

| | | | | |
|---|---|---|---|---|
| 2019/0105775 A1* | 4/2019 | Oyama | .................. | B25J 9/1676 |
| 2020/0070353 A1* | 3/2020 | Matsumoto | ............ | B25J 9/1612 |
| 2021/0237261 A1* | 8/2021 | Kinoshita | .............. | B25J 9/0081 |
| 2021/0260759 A1* | 8/2021 | Knudsen | ............ | G05B 19/4155 |
| 2021/0283781 A1* | 9/2021 | Watanabe | ............ | G01G 19/393 |
| 2021/0323147 A1* | 10/2021 | Oaki | ...................... | B25J 13/085 |
| 2022/0080597 A1* | 3/2022 | Huang | ................... | B25J 9/1692 |
| 2022/0371195 A1* | 11/2022 | Lee | ........................ | B25J 9/1697 |
| 2024/0009857 A1* | 1/2024 | Nagakari | .............. | B25J 9/1612 |

FOREIGN PATENT DOCUMENTS

| | | |
|---|---|---|
| JP | 2557076 B | 11/1996 |
| JP | 2002-028883 A | 1/2002 |
| JP | 2013-052486 A | 3/2013 |
| JP | 2014-014902 A | 1/2014 |
| JP | 5849477 B | 1/2016 |

* cited by examiner

FIG. 4

ROBOT CONTROL DEVICE

TECHNICAL FIELD

The present application relates to a robot control device.

BACKGROUND

Regarding robots including force sensors, there is a known method for controlling a robot on the basis of forces and moments detected by the force sensor (for example, see Japanese Unexamined Patent Application, Publication No. 2014-14902).

SUMMARY

An aspect of the present application is directed to a robot control device that controls a robot in which a sensor capable of measuring forces is installed, the robot control device including: a measurement-value acquisition unit that acquires a first measurement value, which is measured by the sensor when a first tool having a known mass and center-of-gravity position is disposed at a distal end of a wrist of the robot and the wrist performs a specific motion, and a second measurement value, which is measured by the sensor when a second tool having known mass and center-of-gravity position is disposed and the wrist performs the specific motion; a measurement-value storage unit that stores the first measurement value and the second measurement value acquired by the measurement-value acquisition unit; and a correction unit that corrects the measurement values measured by the sensor on a basis of the first measurement value and the second measurement value stored in the measurement-value storage unit when a tool for which the mass thereof is unknown is disposed.

BRIEF DESCRIPTION OF DRAWINGS

Figure 4:
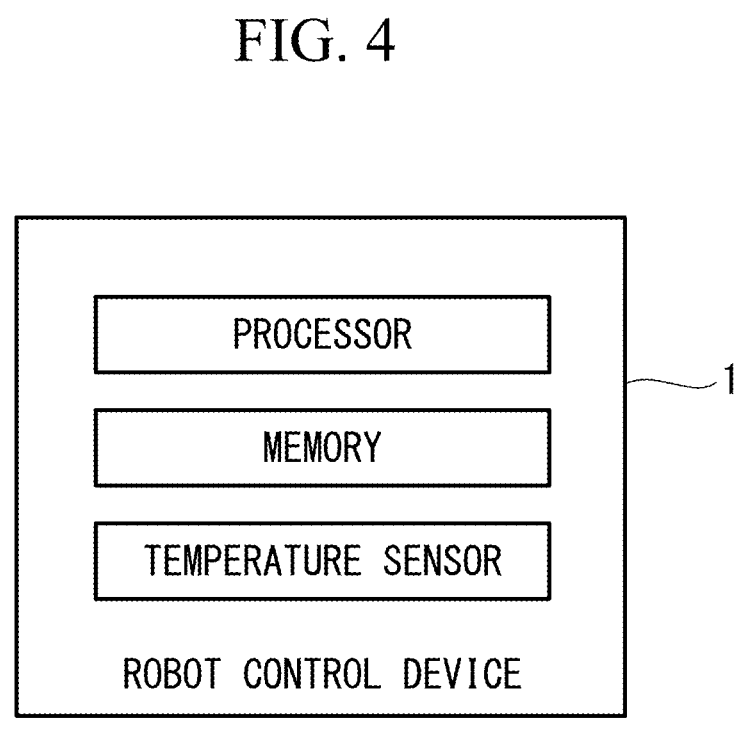

FIG. 4 is a block diagram illustrating a processor, a memory, and a temperature sensor included in the robot control device in FIG. 1.

DESCRIPTION OF EMBODIMENT

A robot control device 1 according to an embodiment of the present application will be described below with reference to the drawings.

Figure 1:
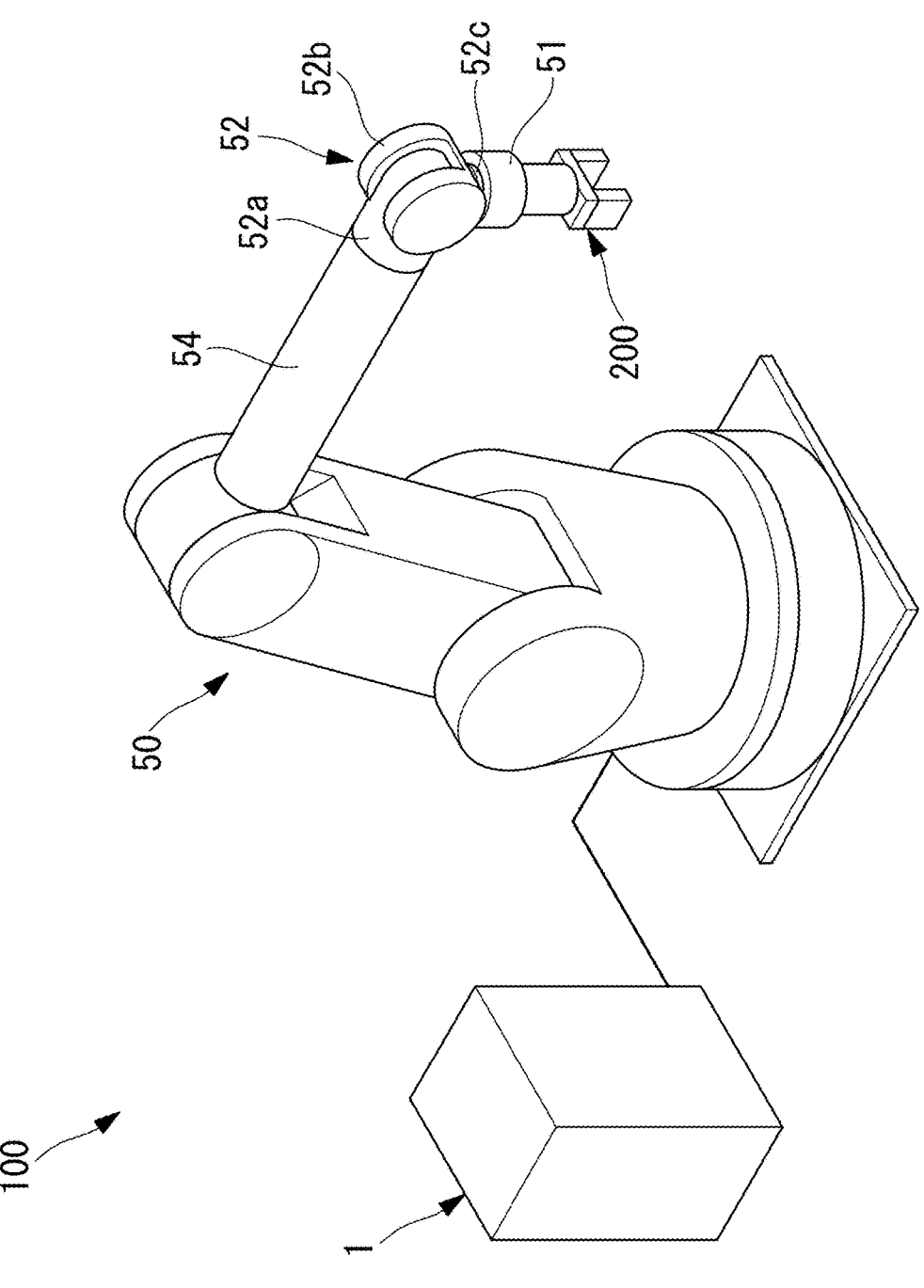
FIG. 1 is an overall configuration diagram showing a robot system including a robot control device according to an embodiment of the present application.

As shown in FIG. 1, a robot system 100 includes: a robot 50 in which a force sensor (sensor) 51 is installed; and the robot control device 1 according to this embodiment.

The force sensor 51 is, for example, a six-axis sensor that is capable of separately detecting the magnitudes of forces that act in three axial directions that are orthogonal to each other and the magnitudes of moments that act about the three axes.

The force sensor 51 is secured, for example, between a flange 53 at a distal end of a wrist 52 of the robot 50 and a tool 200 attached to the distal end of the wrist 52, as shown in FIG. 1.

The tool 200 is, for example, a hand that has two or more fingers that open and close and that is capable of grasping a workpiece W between the fingers.

The hand 200 has a known mass and center-of-gravity position, and, although the mass and the center-of-gravity position do not significantly change due to opening and closing of the fingers 210, mass and center-of-gravity position including the workpiece W change as a result of grasping the workpiece W between the fingers 210.

Figure 2:
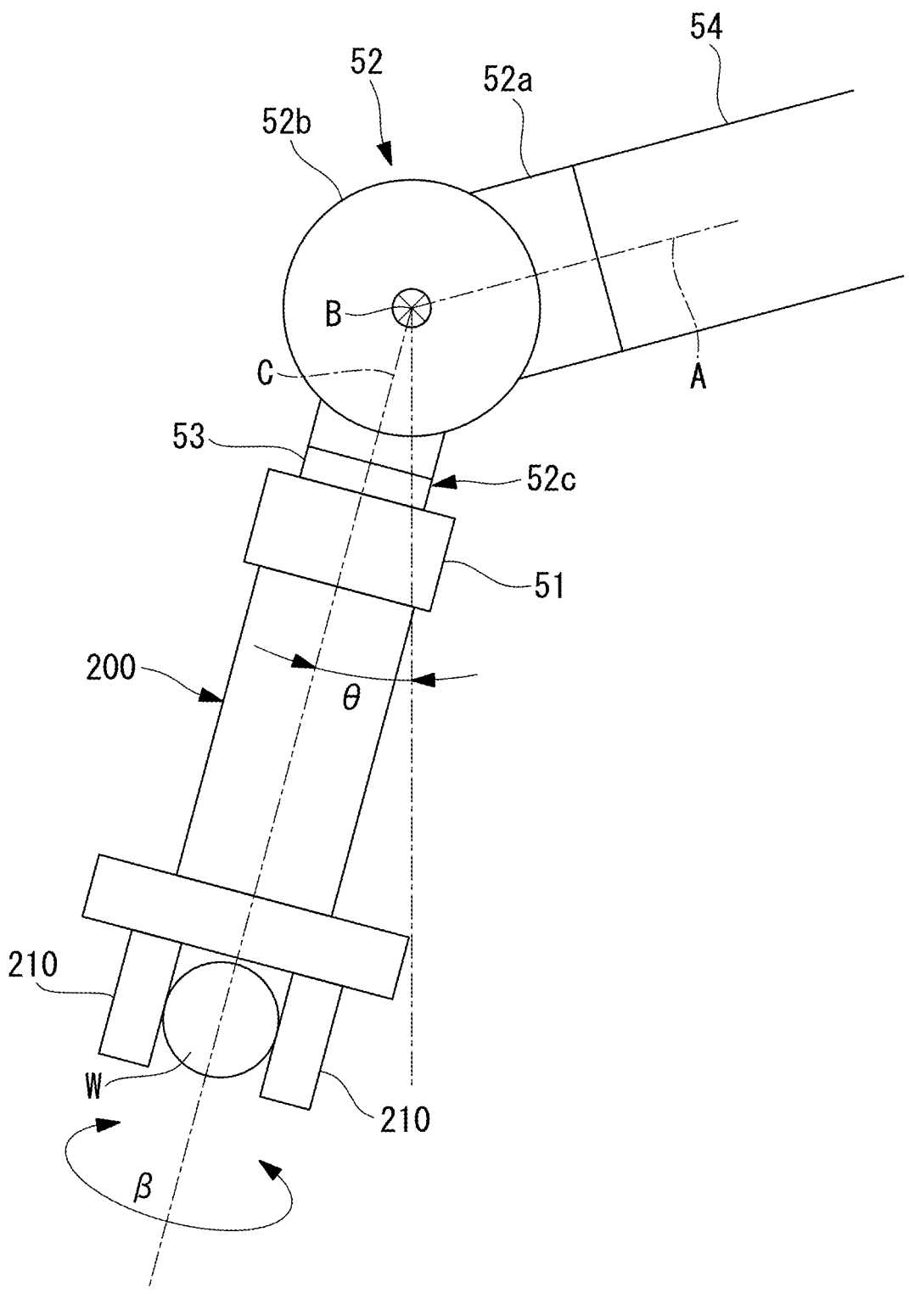
FIG. 2 is a diagram for explaining a motion of a wrist of a robot for correcting, by means of the robot control device in FIG. 1, a measurement value measured by a force sensor.

As shown in FIGS. 1 and 2, the wrist 52 of the robot 50 is a three-axis wrist unit including a first wrist element 52a, a second wrist element 52b, and a third wrist element 52c. The first wrist element 52a is supported at a distal end of an arm 54 so as to be rotatable about a first axis A, which is the longitudinal axis of the arm 54. The second wrist element 52b is supported at the first wrist element 52a so as to be rotatable about a second axis B that is orthogonal to the first axis A. The third wrist element 52c includes a flange 53 that is supported by the second wrist element 52b so as to be rotatable about a third axis C that is orthogonal to the second axis B and that intersects the first axis A.

Figure 3:
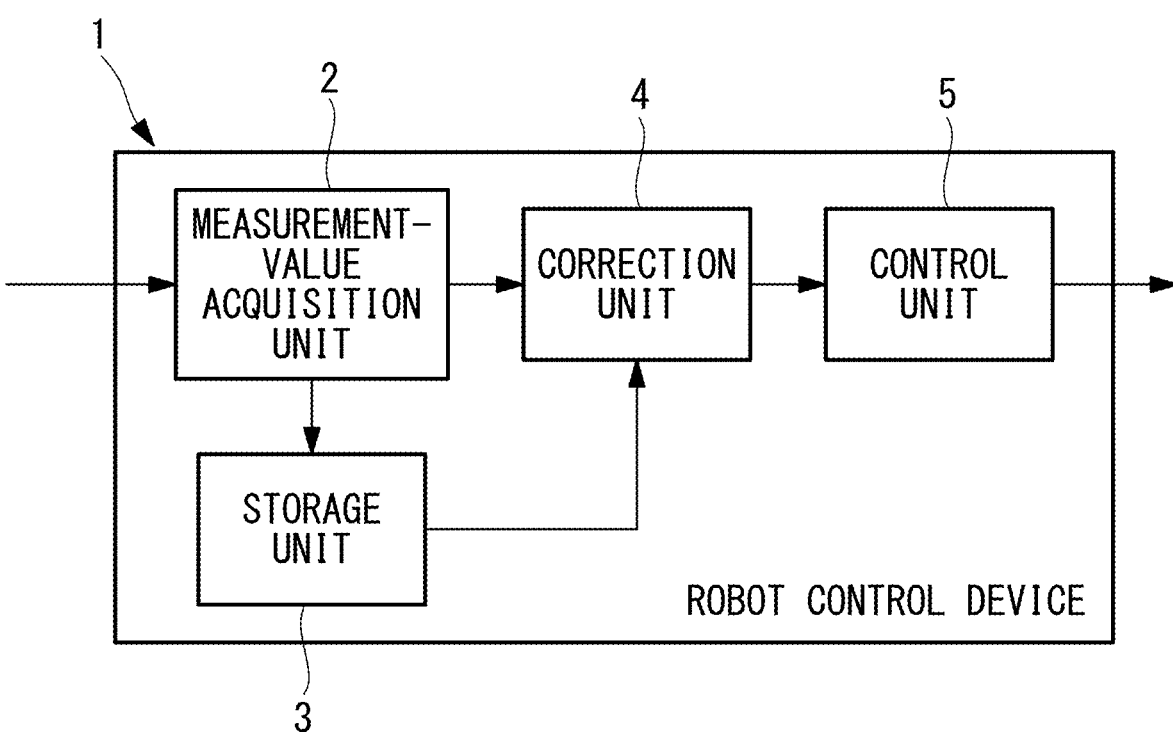
FIG. 3 is a block diagram showing the robot control device in FIG. 1.

The robot control device 1 according to this embodiment includes at least one processor and a memory. The memory stores a motion program that is executed when acquiring data for correcting the force sensor 51. As shown in FIG. 3, the robot control device 1 includes: a measurement-value acquisition unit 2 that acquires a measurement values of the forces measured by the force sensor 51 while the robot 50 performs a specific motion in accordance with the motion program stored in the memory; and a storage unit (measurement-value storage unit) 3 that stores the acquired measurement values of the forces.

In addition, the robot control device 1 includes a correction unit 4 that corrects, on the basis of the measurement values of the forces stored in the storage unit 3, the measurement values measured by the force sensor 51 when the hand 200 grasps the workpiece W for which the mass thereof is unknown, and that calculates the mass of the workpiece W. Furthermore, the robot control device 1 includes a control unit 5 that controls the robot 50 on the basis of the mass of the workpiece W calculated by the correction unit 4.

The specific motion is, for example, a motion that causes the second wrist element 52b to be rotated about the second axis (axis) B that is substantially horizontally disposed with reference to a state in which the third axis C is orientated vertically downward. While the second wrist element 52b performs the specific motion in a state in which the flange 53 of the third wrist element 52c is set at a prescribed angle β about the third axis C, the measurement-value acquisition unit 2 acquires the forces measured by the force sensor 51 at an inclination angle θ about the second axis B with a prescribed angle interval, for example, 5° interval. Also, the specific motion is repeated every time the angle β about the third axis C of the third wrist element 52c is changed by the prescribed angle interval, for example, 5° interval.

In this embodiment, a user prepares a workpiece W for which the mass thereof is known and causes the hand 200 to perform, in the state in which the workpiece W is grasped by the hand 200, the same specific motion as when the workpiece W is not grasped. As the workpiece W, it is preferable to prepare a workpiece having a greater mass than the mass of a workpiece W that will be handled in actual work.

Between when the workpiece W is grasped and when the workpiece W is not grasped, the center-of-gravity position of the hand 200 including the workpiece W changes. Specifically, the measurement-value acquisition unit 2 acquires a measurement value (first measurement value) measured by the force sensor 51 when the hand (tool) 200 is disposed at a first center-of-gravity position without grasping the workpiece W and a measurement value (second measurement value) measured by the force sensor 51 when the hand 200 is disposed at a second center-of-gravity position while grasping the workpiece W for which the mass thereof is known. Then, the acquired first measurement value and second measurement value are stored in the storage unit 3 in association with the same posture of the wrist 52.

Specific operations are as indicated below.

In a state in which a workpiece W having a known weight Ga is grasped (Ga is 0 when the workpiece W is not grasped), measurement values $Fa_{11}$ and $Fa_{12}$ are acquired by the force sensor 51 with a setting in which the inclination angle $\theta$ about the second axis B is $\theta_1$ and the rotation angles $\beta$ about the third axis C are $\beta_1$ and $\beta_2$. In addition, in the state in which the workpiece W having the known weight Ga is grasped, measurement values $Fa_{21}$ and $Fa_{22}$ are acquired by the force sensor 51 with a setting in which the inclination angle $\theta$ about the second axis B is $\theta_2$ and the rotation angles $\beta$ about the third axis C are $\beta_1$ and $\beta_2$. $\beta_2$ is $\beta_1+5°$ and $\theta_2$ is $\beta_1+5°$.

Next, in the state in which the workpiece W having the known weight Gb is grasped, measurement values $Fb_{11}$ and $Fb_{12}$ are acquired by the force sensor 51 with a setting in which the inclination angle $\theta$ about the second axis B is $\theta_1$ and the rotation angles $\beta$ about the third axis C are $\beta_1$ and $\beta_2$. In addition, in the state in which the workpiece W having the known weight Gb is grasped, measurement values $Fb_{21}$ and $Fb_{22}$ are acquired by the force sensor 51 with a setting in which the inclination angle $\theta$ about the second axis B is $\theta_2$ and the rotation angles $\beta$ about the third axis C are $\beta_1$ and $\beta_2$.

The acquired measurement values F are associated with the weights G of the workpiece W, the angles $\theta$ about the second axis B, and the rotation angles $\beta$ about the third axis C, and $(Ga, \theta_1, \beta_1, Fa_{11})$,
$(Ga, \theta_1, \beta_2, Fa_{12})$,
$(Ga, \theta_2, \beta_1, Fa_{21})$,
$(Ga, \theta_2, \beta_2, Fa_{22})$
$(Gb, \theta_1, \beta_1, Fb_{11})$,
$(Gb, \theta_1, \beta_2, Fb_{12})$,
$(Gb, \theta_2, \beta_1, Fb_{21})$,
$(Gb, \theta_2, \beta_2, Fb_{22})$,
. . .

are stored in the storage unit 3.

In the case in which the user handles, by means of the same hand 200, a workpiece W having an unknown mass Gc in this state, the correction unit 4 corrects the measurement values measured by the force sensor 51, as described below, and thus, the mass Gc is determined.

Specifically, in the case in which the measurement value acquired by the force sensor 51 is Fc when the inclination angle $\theta$ about the second axis B is $\theta_3$ ($\theta_1 \le \theta_3 < \theta_2$) and the rotation angle $\beta$ about the third axis C is $\beta_3$ ($\beta_1 \le \beta_3 < \beta_2$), the correction unit 4 outputs a mass Gc obtained by correcting the output value Fc of the force sensor 51 by using the following equation (1).

{Eq. 1}

$$Gc=Ga+(Gb-Ga)(Fc-Fa)/(Fb-Fa) \qquad (1)$$

where

{Eq. 2}

$$Fa=\{Fa_1(\theta_2-\theta_3)+Fa_2(\theta_3-\theta_1)\}/(\theta_2-\theta_1) \qquad (2)$$

{Eq. 3}

$$Fb=\{Fb_1(\theta_2-\theta_3)+Fb_2(\theta_3-\theta_1)\}/(\theta_2-\theta_1) \qquad (3)$$

{Eq. 4}

$$Fa_1=\{Fa_{11}(\beta_2-\beta_3)+Fa_{12}(\beta_3-\beta_1)\}/(\beta_2-\beta_1) \qquad (4)$$

{Eq. 5}

$$Fa_2=\{Fa_{21}(\beta_2-\beta_3)+Fa_{22}(\beta_3-\beta_1)\}\beta_2-\beta_1) \qquad (5)$$

{Eq. 6}

$$Fb_1=\{Fb_{11}(\beta_2-\beta_3)+Fb_{12}(\beta_3-\beta_1)\}/(\beta_2-\beta_1) \qquad (6)$$

{Eq. 7}

$$Fb_2=\{Fb_{21}(\beta_2-\beta_3)+Fb_{22}(\beta_3-\beta_1)\}(\beta_2-\beta_1)) \qquad (7)$$

Once the unknown mass Gc of the workpiece W is determined, it is possible to calculate the mass and the center-of-gravity position of the hand 200 including the workpiece W from information about the mass Gc and the center-of-gravity position of the workpiece W and information about the known mass and the center-of-gravity position of the hand 200.

As has been described above, with the robot control device 1 according to this embodiment, the user mounts the tool 200, which is actually used, on the robot 50, causes the robot 50 to perform the specific motion in the two states in which the center-of-gravity positions of the tool 200 are different, acquires the measurement values by means of the force sensor 51, and stores said values. Accordingly, even if the measurement values measured by the force sensor 51 are affected by the rigidity of the tool 200 when the user uses the tool 200 at an unknown center-of-gravity position, it is possible to calculate a center-of-gravity position of the tool 200 that is closer to reality by correcting, on the basis of the stored measurement values, the measurement values acquired by the force sensor 51.

For example, even in the case in which the tool is the hand 200 and the mass of the workpiece W grasped by the hand 200 is unknown in actually performed work, it is possible to precisely determine the unknown mass by acquiring, before performing the work, measurement values acquired by the force sensor 51 by employing a workpiece W for which the weight thereof is known. Accordingly, there is an advantage in that, for example, in positioning motions of the hand 200, it is possible to precisely position the hand 200 by precisely correcting deflection or the like of the robot 50 based on the determined weight of the workpiece W.

In particular, as a result of realizing the two states in which the center-of-gravity positions of the hand 200 are different by setting a state in which a workpiece W for which the mass thereof is known is grasped and a state in which the workpiece W is not grasped, it suffices to prepare a single workpiece W having a known mass. In addition, it is possible to ensure, in a simple manner, a large difference between the masses of the workpieces W for realizing the two states.

Note that, in this embodiment, although the width between the inclination angles $\theta$ about the second axis B and the width between the rotation angles $\beta$ about the third axis C are set to be 5°, alternatively, said widths may be set at an arbitrary angle width. Although setting a smaller width enhances the precision of the correction, because the amount of data the user needs to acquire beforehand increases, it is not necessary to set the width to be smaller beyond a required magnitude.

In addition, in this embodiment, in the case in which the ambient temperature during actual work performed by the user fluctuates, fluctuations in the output of the force sensor 51 due to the fluctuations in the ambient temperature may also be corrected.

In this case, for example, the same measurements as those described above are taken with a setting in which an ambient temperature T is $T_1$. In addition, for example, at the ambient temperature T of $T_2$, the workpiece W having a known weight Ga is grasped and a measurement value $Fc_{11}$ acquired by the force sensor 51 with a setting in which the inclination angle θ about the second axis B is $θ_1$ and the rotation angle β about the third axis C is $β_1$ is acquired.

In this case, the robot control device 1 needs to include a temperature sensor for measuring the ambient temperatures T, and information to be stored is as indicated below. Outputs of the temperature sensor are input to the measurement-value acquisition unit 2.

(Ga, $T_1$, $θ_1$, $β_1$, $Fa_{11}$),
(Ga, $T_1$, $θ_1$, $β_2$, $Fa_{12}$),
(Ga, $T_1$, $θ_2$, $β_1$, $Fa_{21}$),
(Ga, $T_1$, $θ_2$, $β_2$, $Fa_{22}$),
(Gb, $T_1$, $θ_1$, $β_1$, $Fb_{11}$),
(Gb, $T_1$, $θ_1$, $β_2$, $Fb_{12}$),
(Gb, $T_1$, $θ_2$, $β_1$, $Fb_{21}$),
(Gb, $T_1$, $θ_2$, $β_2$, $Fb_{22}$)
(Ga, $T_2$, $θ_1$, $β_1$, $Fc_{11}$),
. . .

The ambient temperature T when performing actual work is $T_3$ ($T_1 ≤ T_3 < T_2$).

In the case in which the user handles, by means of the same hand 200, a workpiece W having an unknown mass Gc in this state at the ambient temperature $T_3$, the correction unit 4 corrects the sensor outputs, as described below.

Specifically, in the case in which the output value of the force sensor 51 is Fc when the inclination angle θ about the second axis B is $θ_3$ ($θ_1 ≤ θ_3 < θ_2$) and the rotation angle R about the first axis A is $β_3$ ($β_1 ≤ β_3 < β_2$), the correction unit 4 outputs the mass Gc obtained by correcting the output value Fc of the force sensor 51 by means of equation (1), described above.

Here, equations (8) to (19), indicated below, are applied instead of equations (4) to (7).

{Eq. 8}

$$Fa_1 = \{Fa_{11T}(β_2 - β_3) + Fa_{12T}(β_3 - β_1)\}/(β_2 - β_1) \tag{8}$$

{Eq. 9}

$$Fa_2 = \{Fa_{21T}(B_2 - β_3) + Fa_{22T}(β_3 - β_1)\}(B_2 - β_1) \tag{9}$$

{Eq. 10}

$$Fb_1 = \{Fb_{11T}(β_2 - β_3) + Fb_{12T}(β_3 - β_1)\}/(β_2 - β_1) \tag{10}$$

{Eq. 11}

$$Fb_2 = \{Fb_{21T}(β_2 - β_3) + Fb_{22T}(β_3 - β_1)\}/(β_2 - β_1) \tag{11}$$

{Eq. 12}

$$Fa_{11T} = \{Fa_{11T}(T_2 - T_3) + Fc_{11}(T_3 - T_1)\}(T_2 - T_1) \tag{12}$$

{Eq. 13}

$$Fa_{12T} = \{Fa_{12}(T_2 - T_3) + Fc_{11}(T_3 - T_1)\}/(T_2 - T_1) \tag{13}$$

{Eq. 14}

$$Fa_{21T} = \{Fa_{21}(T_2 - T_3) + Fc_{11}(T_3 - T_1)\}/(T_2 - T_1) \tag{14}$$

{Eq. 15}

$$Fa_{22T} = \{Fa_{22}(T_2 - T_3) + Fc_{11}(T_3 - T_1)\}/(T_2 - T_1) \tag{15}$$

{Eq. 16}

$$Fb_{11T} = \{Fb_{11}(T_2 - T_3) + Fc_{11}(T_3 - T_1)\}/(T_2 - T_1) \tag{16}$$

{Eq. 17}

$$Fb_{12T} = \{Fb_{12}(T_2 - T_3) + Fc_{11}(T_3 - T_1)\}/(T_2 - T_1) \tag{17}$$

{Eq. 18}

$$Fb_{21T} = \{Fb_{21}(T_2 - T_3) + Fc_{11}(T_3 - T_1)\}/(T_2 - T_1) \tag{18}$$

{Eq. 19}

$$Fb_{22T} = \{Fb_{22}(T_2 - T_3) + Fc_{11}(T_3 - T_1)\}/(T_2 - T_1) \tag{19}$$

Accordingly, in the case in which the ambient temperature T changes also, it is possible to precisely correct the measurement values acquired by the force sensor 51.

In addition, in this embodiment, for the case in which the workpiece W for which the mass thereof is known is present and for the case in which the workpiece W for which the mass thereof is known is absent, the measurement values acquired by the force sensor 51 are discretely acquired in advance with respect to the inclination angles θ about the second axis B, the rotation angles β about the third axis C, and the ambient temperatures T, and thus, a database was constructed. Then, in the actual work, by linearly interpolating the measurement values in the constructed database, an unknown mass of the workpiece W determined from the measurement values acquired by the force sensor 51 was corrected.

Alternatively, the correction may be performed by means of other interpolation methods. In addition, a calculation formula for calculating the mass of a workpiece W from the measurement values acquired by the force sensor 51 may be constructed. When constructing the calculation formula, a learning function may be employed. In this case, it is necessary to collect an appropriate amount of data in order to obtain a calculation formula with a high precision. In addition, the calculation formula may be periodically re-identified in order to cope with changes over years.

In addition, a temperature of the force sensor 51 may be measured instead of measuring the ambient temperature T.

In addition, is this embodiment, the hand 200 that is capable of grasping the workpiece W has been described as an example of the tool; alternatively, however, the present invention may be applied to a robot including another arbitrary tool that has a movable part with which a large motion is performed and in which the center-of-gravity position thereof fluctuates before and after the motion.

The invention claimed is:

1. A robot control device that controls a robot in which a sensor configured for measuring forces is installed, the robot control device comprising:

at least one processor comprising hardware, the at least one processor being connected to the sensor; and a storage, wherein the at least one processor is configured to:

receive, from the sensor, a plurality of first measurement values, which are measured by the sensor when a tool having a known mass and center-of-gravity position is disposed at a distal end of a wrist of the robot and the wrist performs a specific motion in a state where the tool is not grasping a workpiece, and a plurality of second measurement values, which are measured by the sensor when the wrist performs the specific motion in a state where the tool is grasping the workpiece for which the mass thereof is known;

store the received first measurement values and the received second measurement values in the storage in association with a posture of the robot at a time when each of the plurality of first measurement values and the plurality of second measurement values were measured to construct a database; and correct the measurement values measured by the sensor on a basis of the constructed database when a tool grasping a workpiece for which the mass thereof is unknown is disposed.

2. The robot control device according to claim 1, wherein:

the specific motion causes the tool to be rotated about an axis that is substantially horizontally disposed; and the plurality of first measurement values and the plurality of second measurement values are acquired for each of prescribed angles about the axis.

3. The robot control device according to claim 1, wherein the correcting of the measurement values comprises linearly interpolating each of the measurement values in the constructed database.

4. The robot control device according to claim 1, further comprising a temperature sensor, wherein:

the at least one processor is further configured to:

be connected to the temperature sensor;

receive a plurality of ambient temperatures measured by the temperature sensor when the wrist performs the specific motion; and store the received ambient temperatures in the storage in association with the posture of the robot at the time when each of the plurality of first measurement values and the plurality of second measurement values were measured to construct the database.

5. A robot control device that controls a robot in which a sensor configured for measuring forces is installed, the robot control device comprising:

at least one processor comprising hardware, the at least one processor being connected to the sensor; and a storage, wherein the at least one processor is configured to:

receive, from the sensor, a plurality of first measurement values, which are measured by the sensor when a tool having a known mass and whose center-of-gravity position is changed by movement is disposed at a distal end of a wrist of the robot and the wrist performs a specific motion in a state where the tool is in a first center-of-gravity position, and a plurality of second measurement values, which are measured by the sensor when the wrist performs the specific motion in a state where the tool is in a second center-of-gravity position different from the first center-of-gravity position;

store the received first measurement values and the received second measurement values in the storage in association with a posture of the robot at a time when each of the plurality of first measurement values and the plurality of second measurement values were measured to construct a database; and correct the measurement values measured by the sensor on a basis of the constructed database when the tool whose center-of-gravity is unknown is disposed.

6. The robot control device according to claim 5, wherein:

the specific motion causes the tool to be rotated about an axis that is substantially horizontally disposed; and the plurality of first measurement values and the plurality of second measurement values are acquired for each of prescribed angles about the axis.

7. The robot control device according to claim 5, wherein the correcting of the measurement values comprises linearly interpolating each of the measurement values in the constructed database.

8. The robot control device according to claim 5, further comprising a temperature sensor, wherein:

the at least one processor is further configured to:

be connected to the temperature sensor;

receive a plurality of ambient temperatures measured by the temperature sensor when the wrist performs the specific motion; and store the received ambient temperatures in the storage in association with the posture of the robot at the time when each of the plurality of first measurement values and the plurality of second measurement values were measured to construct the database.

* * * * *